United States Patent [19]

Debortoli et al.

[11] Patent Number: 5,067,784

[45] Date of Patent: Nov. 26, 1991

[54] CONNECTOR HOLDERS

[76] Inventors: George Debortoli, 257 Marilyn Avenue, Ottawa, Ontario, Canada, K1V 7E4; Helmut H. Lukas, 95 Lake Avenue West, Carleton Place, Ontario, Canada, K7C 1L7

[21] Appl. No.: 610,894

[22] Filed: Nov. 19, 1990

[51] Int. Cl.$^5$ .............................................. G02B 6/36
[52] U.S. Cl. ...................................... 385/53; 385/135
[58] Field of Search ............................. 350/96.2, 96.23

[56] References Cited

FOREIGN PATENT DOCUMENTS 0281196 9/1988 European Pat. Off. ......... 350/96.23
3413401 10/1985 Fed. Rep. of Germany ..... 350/96.2
3532314 3/1987 Fed. Rep. of Germany ... 350/96.23

Primary Examiner—Frank Gonzalez
Assistant Examiner—John Ngo

[57] ABSTRACT

A planar connector holder for optical fibers with a storage facility for coiled fiber, a mounting region at the front end region of the holder for connectors with an end of each connector facing forwardly. The holder has a connector guard to shield the forward facing ends of the connectors. The shield is located in front of the mounting region to define a space for other optical fibers to be connected to the forward facing ends of the connectors. Provision is made for limiting the minimum bend radius of fibers as they enter into this space and then laterally of the holder through an inlet to the space.

5 Claims, 3 Drawing Sheets

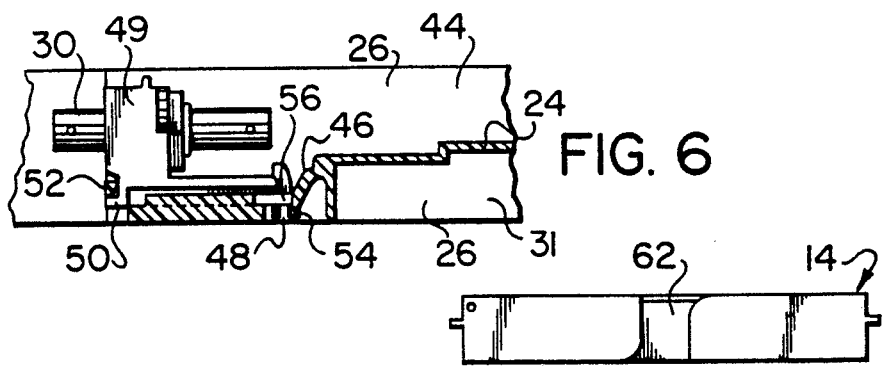
FIG. 6
FIG. 7
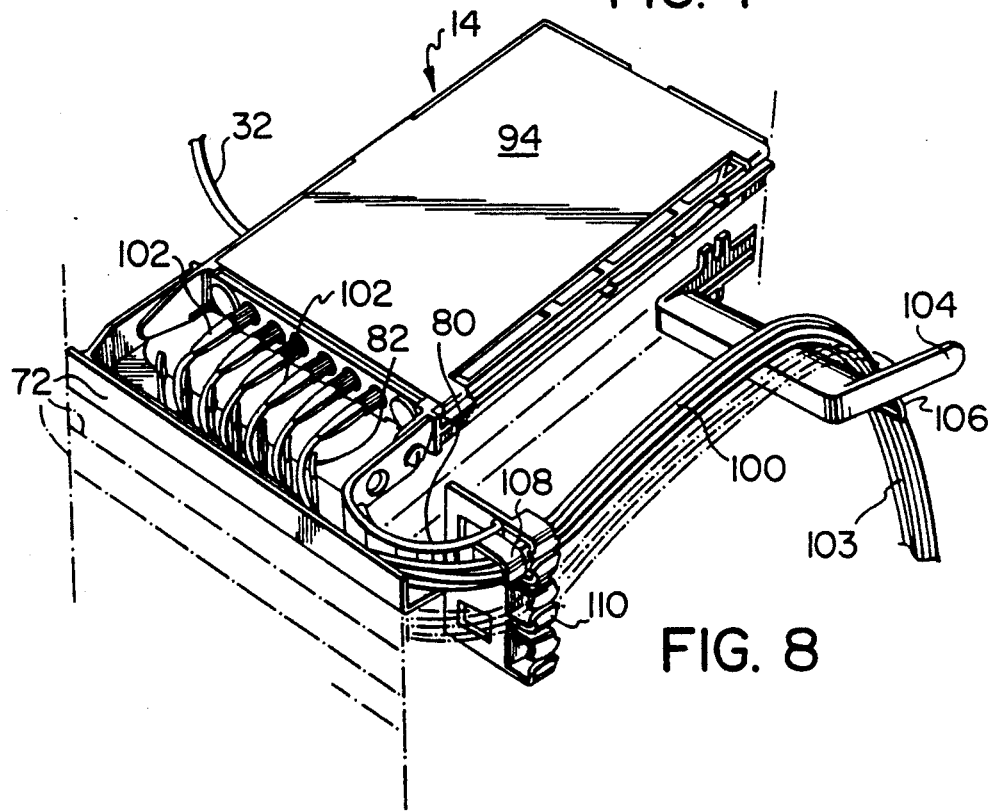
FIG. 8
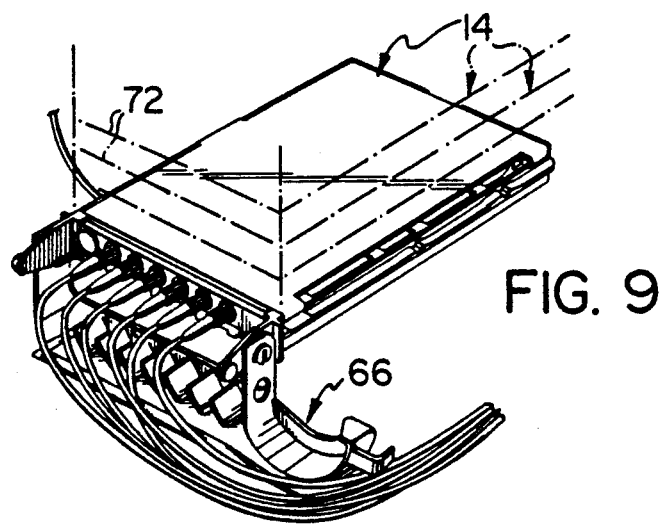
FIG. 9

CONNECTOR HOLDERS

This invention relates to connector holders for optical fibers.

Connector holders for optical fibers are known primarily through publications in patent specifications, but also in a few commercially available designs. In U.S. Pat. No. 4,792,203, for example, a holder structure is described in which a storage space is provided for optical fibers entering the structure from an incoming cable and optical connectors are mounted on an arm located at the one side of the holder and to which the optical fibers are connected. Other optical fibers exit from the other ends of the connectors and also pass through the storage space of the holder before proceeding as distribution fibers to telecommunications equipment in a customer's premises. A plurality of such holders are mounted in a housing and are pivotally attached so as to be movable into a withdrawn or use position within the housing or an access position pivoted at the front of the housing for maintenance purposes.

In a further structure, such as described in German Offenlegungschrift 2735106, a housing carries a tray which is pivotally mounted for movement in and out of the housing. Incoming optical fibers are stored within the tray and are connected to pigtail fibers also stored within the tray. The pigtail fibers extend from the tray to pigtail connectors mounted at the rear of the housing.

In a recent U.S. patent application Ser. No. 423,281 in the name of G. Debortoli and entitled "Connector Holders and Distribution Frame and Connector Holder Assemblies for Optical Cable", connector holders are described which are extremely convenient in use both for obtaining access to the optical fiber connectors and also for the fibers themselves. As described in the latter specification, when these holders are mounted in a distribution frame, an increased density of connectors is provided per frontal unit area of frame. In the connector holders as described in patent application No. 423,281, the connectors are mounted at a front end region of the holders so as to be located at the front of a distribution frame in use with one end of each connector faces forwardly for ease of connection of additional fibers. The connector holders described in the aforementioned pending application have connector guards which extend across the front end region of the connectors so that with the holders in use, the guards deflect any light beam exiting from a connector to which a fiber is not connected at the front of the connector.

The holders are constructed so as to provide for minimum bend radius of the fibers passing through the holders whereby attenuation is not significantly increased during use of the fibers.

The present invention seeks to provide a connector holder which has improved pathways for optical fibers taking into account that there should be minimum bend radius requirements so as to avoid significant attenuation in use.

Accordingly, the present invention provides a planar connector holder for connecting a plurality of incoming optical fibers to outgoing optical fibers, the holder having:- a front end region and a rear end region; a storage facility for the storage of a plurality of coiled lengths of fiber with the coils in planes of the holder; a mounting region for a plurality of optical connectors, the mounting region disposed at the front end region of the holder with the storage facility disposed between the mounting region and the rear end region of the holder with the mounting region comprising a plurality of connector mounting positions disposed in a series which extends from mounting position to mounting position along the front end region of the holder for location of connectors in the mounting positions with an end of each connector facing forwardly from the front end region of the holder; a connector guard provided to shield the forward facing end of each connector while being disposed forwardly in front of the mounting region to provide a space between the guard and the mounting region for other optical fibers to extend to the forward facing ends of the connectors, an inlet formed at one side of the holder and forwardly of the mounting region for passage of said other optical fibers into said space; and means for limiting the minimum bend radius of said other optical fibers as they extend in the space from the forwardly facing ends of the connectors and laterally of the holder through the inlet.

Thus in use, with the other optical fibers connected to the forward facing ends of the connectors, these fibers are controlled in position by the minimum bend radius limiting means as they change in direction so as to extend laterally of the holder and through the inlet. These optical fibers are hence unable to bend below the minimum bend radius while in the space between the guard and the mounting region. Preferably, the minimum bend radius limiting means comprises a plurality of convex surface elements spaced apart laterally of the holder whereby the optical fibers may pass from their respective connectors and between the convex surface elements so as to be supported upon respective convex surfaces for limiting the minimum bend radius.

For the purpose of directing the other optical fibers away from the front of the holder in use so as to make the holder more accessible, one side of the guard is provided with a convex minimum bend radius limiting surface provided at the inlet, the convex surface extending outwardly from the space while curving rearwardly of the holder.

One embodiment of the invention will now be described, by way of example, with reference to the accompanying drawings, in which:

FIG. 6 is a cross-sectional view of part of the connector holder taken along line VI—VI in FIG. 3;

FIG. 7 is an end view of the connector holder in the direction of arrow VII in FIG. 3;

FIG. 8 is an isometric view of a connector holder, similar to FIG. 4, but showing the connector holder located in a rearward operative position in the distribution frame with parts of the distribution frame also shown; and FIG. 9 is a view similar to FIG. 8 but showing the connector holder moved to a forward connector access position.

Figure 1:
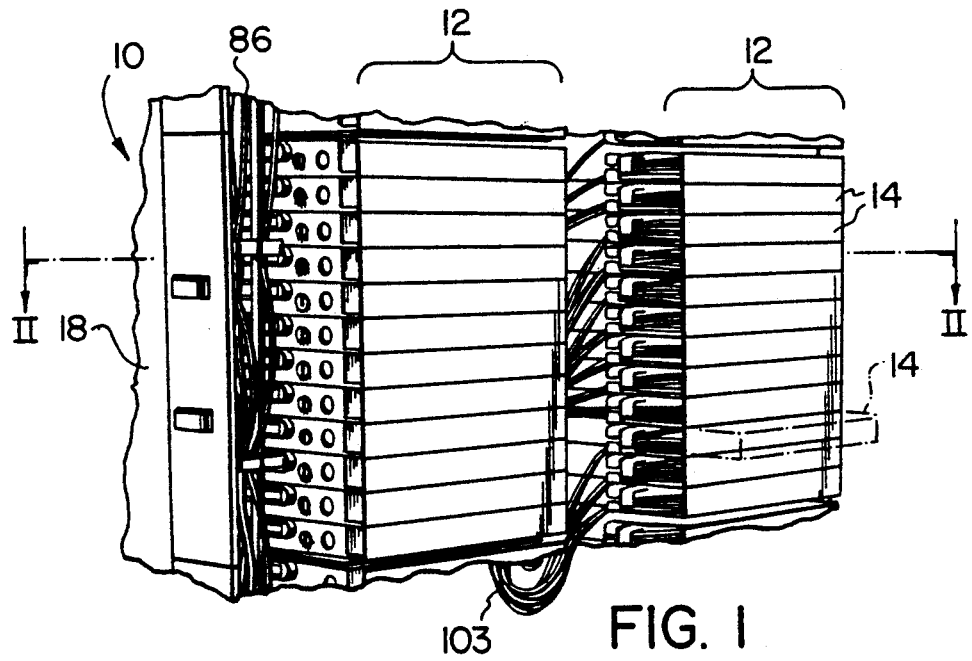
FIG. 1 is an isometric view showing a plurality of connector holders according to the embodiment assembled into a distribution frame, a part only of the assembly being shown.
Figure 2:
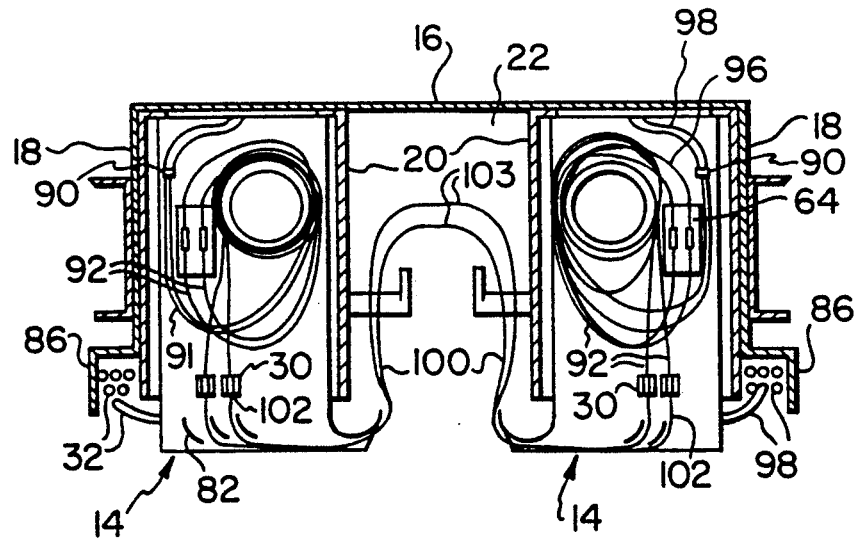
FIG. 2 is a cross-sectional view through the assembly taken along line II—II in FIG. 1.

As shown in FIG. 1 an optical fiber distribution frame 10 holds two vertical banks 12 of planar connector holders 14 for connecting a plurality of incoming optical fibers to outgoing optical fibers. As shown in FIGS. 1 and 2, the distribution frame comprises a rear wall 16 and remote side walls 18 which extend from the rear to an open front of the frame. Between the side walls 18 are two other walls 20 which extend forwardly from the rear wall 16 and lie in parallel relationship to the side walls 18. In each bank 12, a side wall 18 and its corresponding wall 20 define between them receiving stations for the connector holders 14. The two walls 20 are spaced apart as shown in FIG. 2 to provide a storage channel 22 for optical fibers leading from front end regions of the connectors as will be described. The distance between the walls 20 is sufficient to ensure that where loops of fiber are to be disposed within the storage channel then these loops will not have a bend radius below a desired minimum. Each of the connector holders 14 is insertable into a respective receiving station from the front of the distribution frame and is locatable in two positions in the respective station, i.e. in a rearward operative position as shown in FIG. 2 and in full outline in FIG. 1, and a forward connector access position as shown in chain-dotted outline in FIG. 1. The arrangement of the holders 14 in the distribution frame and the construction of the distribution frame is basically similar to that described in copending U.S. patent application Ser. No. 423,281 filed Oct. 18, 1989 (Canadian Application Serial No. 615,192 filed Sept. 29, 1989), entitled "Connector Holders and Distribution Frame and Connector Holder Assemblies for Optical Cable" in the name of G. Debortoli, et al.

Each of the connector holders 14 is basically of the structure described in the above-mentioned copending application. Holders in the right-hand bank 12 in FIG. 1 are of opposite hand to those in the left-hand bank 12. In the following description, a holder for accommodation in the left-hand bank will be described with the understanding that the holders in the right-hand bank are of opposite hand.

Figure 3:
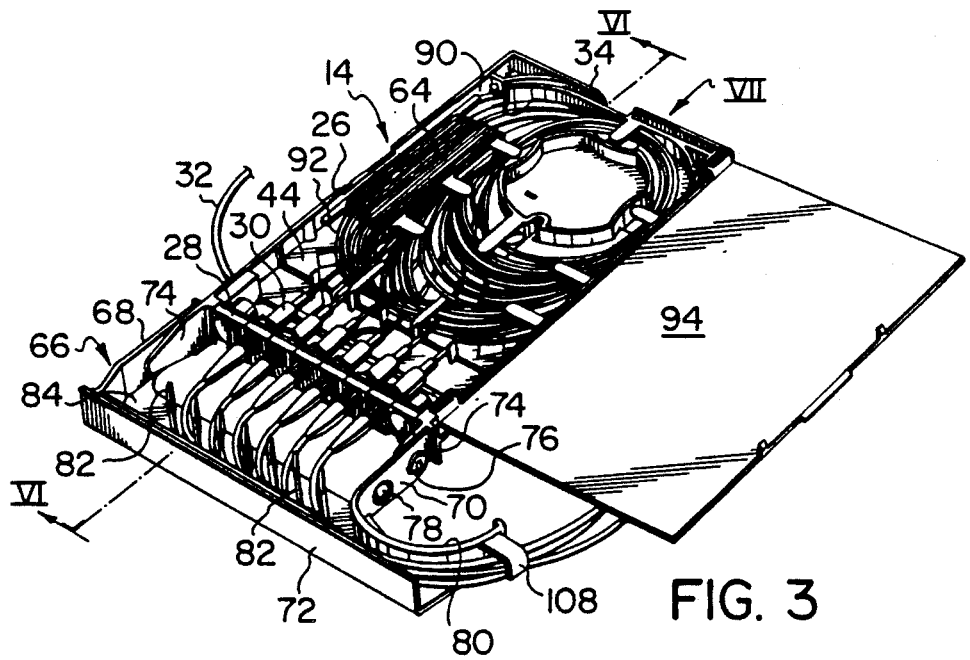
FIG. 3 is an isometric view to a larger scale upon an upper side of one of the connector holders with a cover in an open position.
Figure 4:
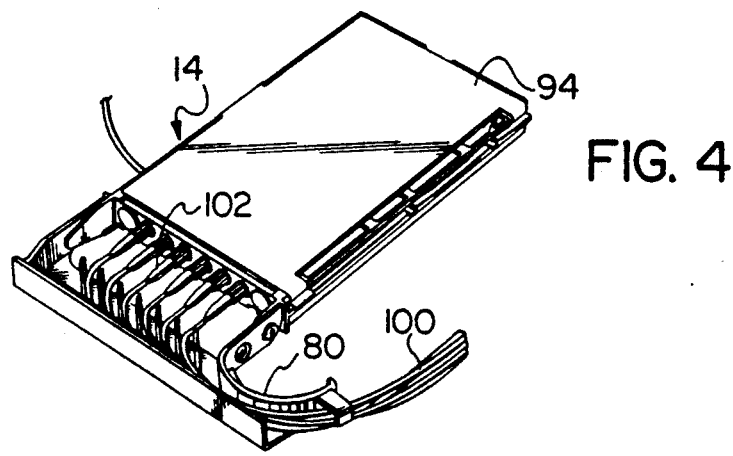
FIG. 4 is a view similar to FIG. 3 with the cover in a closed position.
Figure 5:
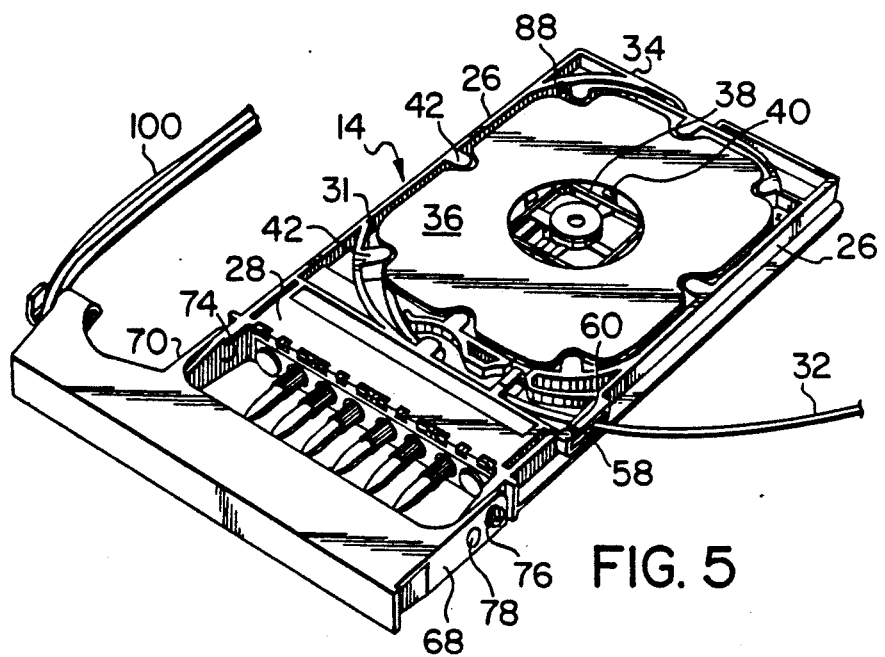
FIG. 5 is an isometric view upon the underside of the connector holder.

Each tray 14 of the left-hand bank is of planar configuration as shown in FIG. 3 and has a planar base 24 (FIG. 6) in the plane of the holder, the base 24 being bordered by side walls 26 which extend to both sides of the base in the depth direction of the holder. At a front end region of the holder is provided a mounting region 28 for optical connectors 30 to be positioned laterally spaced from one another across the width of the holder from one side wall 26 to the other. On one side of the base and between the side walls 26 there is provided a storage compartment 31 (FIGS. 5 and 6) for incoming optical fibers stored within a tube 32 which is one of a plurality of tubes 32 forming the core of an incoming optical cable (not shown). The storage compartment 31 extends between the mounting region 28 and a rear end wall 34 of the holder, the rear end wall extending between the side walls 26. The compartment 31 is provided with a cover 36 which covers substantially the whole of the compartment 31 except the surrounding edges. The cover 36 is movable at right angles to its plane between an inner operative position as shown in FIG. 5 and a slightly retracted position (not shown) in which it stands upwardly from the walls 26 to enable the tube 32 to be passed laterally between edges of the cover and ends of the walls 26 during assembly of the tube into the compartment. The cover is mounted upon a central structure shown at 38 in FIG. 5 and is locatable in its operative and retracted positions by latches 40. Localized flanges 42 extend inwardly into recesses in the cover 36 so as to distort the gap around the cover so as to render it impossible for a tube to be removed with the cover in its operative position.

On the other side of the holder as shown in FIGS. 3 and 6, there is a second compartment 44 provided. This compartment also extends from the mounting region to the rear end 34 of the holder. The base 24, as shown in FIG. 6, extends downwardly at its front end 46 so as to define one side of a recess 48 which extends from side-to-side of the holder, the recess being provided to accommodate the connectors 30 in their side-by-side positions. As described in the aforementioned application, each connector 30 is held by a connector mount 49 which is provided with a forwardly facing foot 50 (FIG. 6) which is to be disposed under an overhanging surface 52 at a front side of the recess. The other end of each connector mount has a flexible latch 54 which is received through a hole 56 in the base of the recess, the latch then engaging beneath the inclined side 46 to hold the connector mounts in position.

Also as described in the aforementioned application, compartment 31 has an inlet 58 at its forward end, the inlet 58 being laterally open at position 60 i.e. at an edge of a side 26, so as to permit the tube 32 to be inserted into the opening 60 and into the inlet. Furthermore, the two compartments are connected at the rear wall 34 of the connector by interconnecting passage 62 (see FIG. 7) to enable the tube 32 to pass from one compartment to the other.

In the other compartment 44, a splice block 64 (FIG. 3) is provided for connecting incoming optical fibers to pigtail fibers, the other ends of the pigtail fibers being provided by the connectors 30.

Each holder 14 also comprises a connector guard 66 mounted at its front end. Generally the guard 66 is as described in the copending application referred to above in that the guard 66 has two sides 68 and 70 and a front 72 which extends across the width of the holder. The two sides 68 and 70 are hinged so as to be movable between an upper connector guarding position in the plane of the holder as shown in FIG. 3 and a downward position removed from the guarding position as shown in FIG. 9.

The guard 66 and the mounting for the guard differ however from the previous application in the following ways.

The guard is pivoted in front of the mounting region 28 upon two forward extensions 74 of the side walls 26 at positions 76 and is normally retained in the guarding position by domed protrusions 78 on free ends of the arms 74, the domed protrusions extending into holes in the side walls 68 and 70. To move the guard 66 into and out of the guarding position, downward or upward pressure on the front of the guard is sufficient so as to cause the extensions 74 to flex inwardly and cause the protrusions 78 to move into or out of the respective holes in the side walls 68 and 70. A space defined between the mounting region 28 and the front 72 of the guard has an inlet provided between the front 72 and an arcuate extension 80 of the side wall 70. The arcuate extension 80 extends laterally sideways from the side 70 and the holder and provides a means for limiting the minimum bend radius of fibers extending from the space while allowing them to pass rearwardly of the holder. The arcuate extension 80 is spaced slightly rearwardly of the front 72 of the guard to provide the inlet.

Means for limiting the minimum bend radius of optical fibers in the space is provided for ends of fibers as they extend from forward facing ends of the connectors 30 when they change direction to pass through the inlet. The means for limiting the minimum bend radius at this position comprises a plurality of arcuate vanes 82 which are disposed in spaced positions across the width of the holder and are supported each by one end upon a flange 84 extending rearwardly from the front 72. The vanes 82 extend upwardly from flange 84 and are suitably positioned relative to respective mounting positions for the connectors 30 so that ends of optical fibers in the space and extending to the connectors 30 engage against a convex surface of a respective vane as it changes direction towards the inlet. With the convex surface of each vane formed to provide a desirable minimum bend radius for the fibers, then no undue mechanical stresses or attenuation will take place in fibers engaging these surfaces.

In use, a plurality of the fibers described above are located complete with connectors and fibers into the left-hand bank shown in FIG. 1 and holders 14 of opposite hand also replete with fibers and connectors are received in the receiving stations in the right-hand bank. As shown in FIGS. 1 and 2, a storage channel 86 is provided at the forward edge on each side wall 1B, each storage channel 86 opening forwardly for receiving a plurality of tubes containing fibers. The left-hand channel 86 contains and guards tubes 32 for incoming fibers from a single incoming optical cable (not shown). The tubes 32 extend one to each of the receiving stations in the left-hand bank and is therefore associated with a respective holder 14. As shown in FIG. 5 which shows the underside of a tray in the left-hand bank 12, a respective tube 32 passes through the inlet 58 and is disposed beneath the cove 36 in a series of coils around the center of the tray in the compartment 31. As discussed in the aforementioned copending application, the tube then passes along an arcuate passageway 88 at the rear of the compartment 31 and through the interconnection passage 62 (see FIG. 7). The tube then continues into the storage compartment 44 and is held in position by a strain relief at position 90, also as described in the aforementioned application. The tube itself then terminates adjacent to this position and fibers 91 (FIG. 2) extending from the tube, extend in coils around the compartment 44 and terminate in the splice block 64. In the splice block 64, the fibers from the tube 32 are spliced to pigtail fibers 92 which also proceed in coils around the compartment 44 and other ends of the pigtail fibers are joined to the optical connectors 30 mounted in the mounting region 28 as shown in FIG. 3. After connecting the fibers in this way, a hinged cover 94 is positioned over the compartment 26 so as to close it for instance as shown in FIG. 8.

Each holder 14 in the right-hand bank 12 (FIG. 2) has its connectors 30 also forming parts of pigtails with pigtail fibers 92 as discussed for the left-hand bank. The pigtail fibers 92 are spliced in the splice block 64 in the right-hand bank to distribution fibers 96 which extend into the end of a tube 98 in the compartment 44. The tube 98 then proceeds from the compartment 44 in the holders in the right-hand bank into the other storage compartment 31 of the holder before continuing out from the holder through the inlet 58. The tubes 98 are then accommodated within the right-hand storage channel 86 as shown in FIG. 2 and proceed to terminal equipment in a customer's premises.

Patch cords are then provided between the two banks of holders. Each patch cord comprises a tube protected fiber 100 and connectors 102 at each end of the fiber. Connectors in the holders in the right-hand bank 12 are selectively connected to connectors in the right-hand bank by use of the patch cords. Hence any connector 30 in one bank may be selectively connected to any connector 30 in the other bank. With all of the connectors in the rearward operative positions in their respective receiving stations as shown in FIGS. 1 and 8, the guards 66 of the holders are held in their connector guarding positions in which they lie directly in front of the connectors 30, either by the fact that the guards are sufficiently close together to prevent their hinging movement out of these positions or by some frame member which prevents movement.

To enable the patch cords to be connected to connectors 30 of any particular holder, then the holder needs to be drawn forwardly from its fully operative position shown in FIG. 8 to its forward connector access position shown in FIG. 9. In the connector access position, the mounting region 28 of a holder is substantially aligned with the fronts 72 of the other holders, so that the particular guard 66 of the holder projects forwardly sufficiently for it to be pivoted downwards and out of the guarding position. This is the position shown in FIG. 9. Hence with selected holders in their forward connector access positions from one bank 12 to the other, the patch cords may be connected between appropriate connectors 30 between the two banks. Superfluous lengths of the tube protected fiber 100 of the patch cords are then passed rearwardly into the storage channel 22 in which they are allowed to hang freely as loops 103 of surplus material (FIGS. 1, 2 and 8) by extending over horizontal support brackets 104 extending outwardly into the storage channel 22 from both of the walls 20. As may be seen from FIG. 8, each of the brackets 104 has a convex surface member 106 which ensures that the fibers 10? in being supported by the surface member do not attain a bend radius below a desired minimum. When all of the connectors 30 of any particular holder have had their patch cords connected to them, then the guard 66 is pivoted upwardly into the connector guarding position shown in FIGS. 3 and 8 and the particular holder is then moved backwardly into the frame so as to assume its rearward fully operative position once more. In this position, as shown in FIG. 8, the tube protected fibers 100 pass from the connectors 102 around respective vanes 82 of the guard 66, around the arcuate extensions 80 as they move from the inlet to the space forwardly of the mounting regions 28, and then beneath a bracket 108 which is a lateral extension at a remote end of the extension 80. With each of the holders in its rearward fully operative position as shown in FIG. 8, the flange 108 forms a part of a corralling arrangement which also comprises a split ring 110 formed as a lateral extension from the associated wall 20. Each of the fibers 100 then passes over the bracket 104 and descends as a free loop 103 in the storage channel 22.

In the assembled condition, the minimum bend radius of each of the tube covered fibers 100 is controlled partly by the vanes 82 as the fibers extend from the connectors 102 and then around the arcuate extension 80 before proceeding over the convex surface member 106. As any of the holders is subsequently drawn forwardly to its connector access position, for instance as shown in FIG. 9, the guard 66 is still in the guarding position during this movement. The forward movement draws surplus material from the corresponding loops 103 of the tube enclosed fiber 100 as the fibers move through the split ring 110 by being drawn forward by the holder. The forward movement of the fibers 100 is resisted by the weight of the loops 103 and also by frictional engagement with the tube covered fibers 100 with the surfaces which they engage. However while this resistance is present, no undue bending of the fiber takes place as at each critical position where the fiber is bent or is likely to become bent, a minimum bend radius element is present to prevent any undue formation of any restrictive bend radius. Thus the vanes 82 particularly and also the arcuate extension 80 and the element 106 prevent any tendency to produce mechanical failure in the fibers or to tension the fibers in such a way that attenuation of a signal could take place.

In a modification of the above embodiment (not shown) each of the banks 12 of holders is serviced by tubes 32 from an incoming cable. The outgoing fibers from the front ends of connectors 30 pass around the arcuate extension 82 as in the embodiment and into the storage channel 22. However, these particular tube covered fibers then proceed directly through the customer's premises to the customer's telecommunications equipment. Hence in the modification, these outgoing fibers replace the looped patch cords of the embodiment. However, when moving holders forwardly into the forward connector access positions, the minimum bend radius provisions which have been described above with regard to the first embodiment operate in the way discussed in the first embodiment to prevent any undue bending of the fibers.

What is claimed is:

1. A planar connector holder for connecting a plurality of incoming optical fibers to outgoing optical fibers, the holder having:
    a front end region and a rear end region;
    a storage facility for the storage of a plurality of coiled lengths of fiber with the coils in the planes of the holder;
    a mounting region for a plurality of optical connectors, the mounting region disposed at the front end region of the holder with the storage facility disposed between the mounting region and the rear end region of the holder with the mounting region comprising a plurality of connector mounting positions disposed in a series which extends from mounting position to mounting position along the front end region of the holder for location of connectors in the mounting positions with an end of each connector facing forwardly from the front end region of the holder;
    a connector guard provided to shield the forward facing end of each connector while being disposed forwardly in front of the mounting region to provide a space between the guard and the mounting region for other optical fibers to extend to the forward facing ends of the connectors, an inlet at one side of the holder and forwardly of the mounting region for passage of said other optical fibers into said space;
    and means for limiting the minimum bend radius of said other optical fibers as they extend in the space from the forward facing ends of the connectors and laterally of the holder through the inlet.

2. A planar connector holder according to claim 1 wherein the means for limiting the minimum bend radius comprises a plurality of convex surface elements which are spaced apart laterally of the holder for laterally supporting said other optical fibers upon said convex surfaces as the extend to the inlet from connectors when mounted in respective mounting positions.

3. A planar connector holder according to claim 1 wherein the connector guard is movable into and out of a connector guarding position in which it is disposed forwardly in front of the mounting region, and the means for limiting the minimum bend radius of the other fibers is provided upon the connector guard.

4. A planar connector holder according to claim 3 wherein the means for limiting the minimum bend radius comprises a plurality of convex surface elements which are carried by the connector guard, and with the connector guard in the guarding position, the convex surface elements are spaced apart laterally of the holder for laterally supporting said other optical fibers upon said convex surfaces as they extend to the inlet from connectors when mounted in respective mounting positions.

5. A planar connector holder according to either claim 3 or claim 4 wherein one side of the guard is provided with a convex minimum bend radius limiting surface at the inlet, the convex surface extending outwardly from the space while curving rearwardly of the holder.

* * * * *